US008250605B2

(12) United States Patent
Opaluch

(10) Patent No.: US 8,250,605 B2
(45) Date of Patent: Aug. 21, 2012

(54) SYSTEMS AND METHODS FOR PRESENTATION OF PREFERRED PROGRAM SELECTIONS

(75) Inventor: Robert Edward Opaluch, Silver Beach, MA (US)

(73) Assignee: Verizon Services Corp., Ashburn, VA (US)

( * ) Notice: Subject to any disclaimer, the term of this patent is extended or adjusted under 35 U.S.C. 154(b) by 479 days.

(21) Appl. No.: 11/611,971

(22) Filed: Dec. 18, 2006

(65) Prior Publication Data

US 2008/0148317 A1    Jun. 19, 2008

(51) Int. Cl.
G06F 3/00        (2006.01)
G06F 13/00       (2006.01)
H04N 5/445       (2011.01)

(52) U.S. Cl. .............. 725/46; 725/44; 725/45; 725/47; 725/48

(58) Field of Classification Search ............... 725/44–48
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |
| 5,684,525 A | 11/1997 | Klosterman |
| 5,701,383 A | 12/1997 | Russo et al. |
| 5,706,145 A | 1/1998 | Hindman et al. |
| 5,727,060 A | 3/1998 | Young |
| 5,734,786 A | 3/1998 | Mankovitz |
| 5,790,198 A | 8/1998 | Roop et al. |
| 5,801,787 A | 9/1998 | Schein et al. |
| 5,808,608 A | 9/1998 | Young et al. |
| 5,809,204 A | 9/1998 | Young et al. |
| 5,812,205 A | 9/1998 | Milnes et al. |
| 5,828,945 A | 10/1998 | Klosterman |

(Continued)

*Primary Examiner* — Dominic D Saltarelli
*Assistant Examiner* — Gigi L Dubasky

(57) ABSTRACT

Preferred systems and methods are disclosed for navigating among a group or lists of programs, such as in a network terminal (such as a set top box) in a video program distribution system which presents a viewer with an electronic program guide comprising a plurality of program titles wherein the order is determined by a program score used to predict a level of interest for the viewer based in part on extrinsic data provided to the network terminal regarding the viewer's characteristics and attributes. The extrinsic data could be obtained based on the individual viewer's specific attributes, or the demographic attributes of similarly situated viewers. The extrinsic data, as well as intrinsic data is processed to provide an ordered list of program which are more reflective of that viewer's interests that a linear listing of programs. The system and method can apply for other applications involving prioritizing selection information.

20 Claims, 10 Drawing Sheets

U.S. PATENT DOCUMENTS

| | | | |
|---|---|---|---|
| 5,870,150 | A | 2/1999 | Yuen |
| 5,886,746 | A | 3/1999 | Yuen et al. |
| 5,915,026 | A | 6/1999 | Mankovitz |
| 5,923,362 | A | 7/1999 | Klosterman |
| 5,940,073 | A | 8/1999 | Klosterman et al. |
| 5,949,954 | A | 9/1999 | Young et al. |
| 5,959,688 | A | 9/1999 | Schein et al. |
| 5,969,748 | A | 10/1999 | Casement et al. |
| 5,970,206 | A | 10/1999 | Yuen et al. |
| 5,974,222 | A | 10/1999 | Yuen et al. |
| 5,987,213 | A | 11/1999 | Mankovitz et al. |
| 5,988,078 | A | 11/1999 | Levine |
| 5,991,498 | A | 11/1999 | Young |
| 6,002,394 | A | 12/1999 | Schein et al. |
| 6,016,141 | A | 1/2000 | Knudson et al. |
| 6,028,599 | A | 2/2000 | Yuen et al. |
| 6,049,652 | A | 4/2000 | Yuen et al. |
| 6,052,145 | A | 4/2000 | Macrae et al. |
| 6,072,983 | A | 6/2000 | Klosterman |
| 6,075,551 | A | 6/2000 | Berezowski et al. |
| 6,075,575 | A | 6/2000 | Schein et al. |
| 6,078,348 | A | 6/2000 | Klosterman et al. |
| 6,091,882 | A | 7/2000 | Yuen et al. |
| 6,118,492 | A | 9/2000 | Milnes et al. |
| 6,133,909 | A | 10/2000 | Schein et al. |
| 6,137,950 | A | 10/2000 | Yuen |
| 6,144,401 | A | 11/2000 | Casement et al. |
| 6,151,059 | A | 11/2000 | Schein et al. |
| 6,167,188 | A | 12/2000 | Young et al. |
| 6,177,931 | B1 | 1/2001 | Alexander et al. |
| 6,216,265 | B1 | 4/2001 | Roop et al. |
| 6,239,794 | B1 | 5/2001 | Yuen et al. |
| 6,247,176 | B1 | 6/2001 | Schein et al. |
| 6,262,722 | B1 | 7/2001 | Allison et al. |
| 6,263,501 | B1 | 7/2001 | Schein et al. |
| 6,323,911 | B1 | 11/2001 | Schein et al. |
| 6,341,195 | B1 | 1/2002 | Mankovitz et al. |
| 6,341,374 | B2 | 1/2002 | Schein et al. |
| 6,388,714 | B1 | 5/2002 | Schein et al. |
| 6,396,546 | B1 | 5/2002 | Alten et al. |
| 6,412,110 | B1 | 6/2002 | Schein et al. |
| 6,430,358 | B1 | 8/2002 | Yuen et al. |
| 6,430,359 | B1 | 8/2002 | Yuen et al. |
| 6,445,306 | B1 * | 9/2002 | Trovato et al. ........... 340/825.24 |
| 6,453,471 | B1 | 9/2002 | Klosterman |
| 6,460,181 | B1 | 10/2002 | Donnelly |
| 6,466,734 | B2 | 10/2002 | Yuen et al. |
| 6,469,753 | B1 | 10/2002 | Klosterman et al. |
| 6,477,705 | B1 | 11/2002 | Yuen et al. |
| 6,498,895 | B2 | 12/2002 | Young et al. |
| 6,505,348 | B1 * | 1/2003 | Knowles et al. ................ 725/49 |
| 6,538,701 | B1 | 3/2003 | Yuen |
| 6,549,719 | B2 | 4/2003 | Mankovitz |
| 6,564,379 | B1 | 5/2003 | Knudson et al. |
| 6,567,606 | B2 | 5/2003 | Milnes et al. |
| 6,588,013 | B1 | 7/2003 | Lumley et al. |
| 6,637,029 | B1 * | 10/2003 | Maissel et al. ................. 725/46 |
| 6,668,133 | B2 | 12/2003 | Yuen et al. |
| 6,687,906 | B1 | 2/2004 | Yuen et al. |
| 6,732,369 | B1 | 5/2004 | Schein et al. |
| 6,742,183 | B1 | 5/2004 | Reynolds et al. |
| 6,745,391 | B1 | 6/2004 | Macrae et al. |
| 6,756,997 | B1 | 6/2004 | Ward et al. |
| 6,760,537 | B2 | 7/2004 | Mankovitz |
| 6,799,326 | B2 | 9/2004 | Boylan et al. |
| 6,799,327 | B1 | 9/2004 | Reynolds et al. |
| 6,850,693 | B2 | 2/2005 | Young et al. |
| 6,859,799 | B1 | 2/2005 | Yuen |
| 6,934,964 | B1 * | 8/2005 | Schaffer et al. ................. 725/46 |
| 7,039,935 | B2 | 5/2006 | Knudson et al. |
| 7,069,576 | B1 | 6/2006 | Knudson et al. |
| 7,487,529 | B1 | 2/2009 | Orlick |
| 2001/0029610 | A1 | 10/2001 | Corvin et al. |
| 2001/0047298 | A1 | 11/2001 | Moore et al. |
| 2001/0054181 | A1 | 12/2001 | Corvin |
| 2002/0069403 | A1 * | 6/2002 | Itoh et al. .......................... 725/9 |
| 2002/0073424 | A1 | 6/2002 | Ward et al. |
| 2002/0083451 | A1 * | 6/2002 | Gill et al. ......................... 725/46 |
| 2002/0112239 | A1 * | 8/2002 | Goldman ........................ 725/46 |
| 2002/0124255 | A1 | 9/2002 | Reichardt et al. |
| 2003/0005445 | A1 | 1/2003 | Schein et al. |
| 2003/0023742 | A1 * | 1/2003 | Allen et al. .................... 709/231 |
| 2003/0056219 | A1 | 3/2003 | Reichardt et al. |
| 2003/0110495 | A1 | 6/2003 | Bennington et al. |
| 2003/0110499 | A1 | 6/2003 | Knudson et al. |
| 2003/0115599 | A1 | 6/2003 | Bennington et al. |
| 2003/0115602 | A1 | 6/2003 | Knee et al. |
| 2003/0163813 | A1 | 8/2003 | Klosterman et al. |
| 2003/0164858 | A1 | 9/2003 | Klosterman et al. |
| 2003/0188310 | A1 | 10/2003 | Klosterman et al. |
| 2003/0188311 | A1 | 10/2003 | Yuen et al. |
| 2003/0196201 | A1 | 10/2003 | Schein et al. |
| 2003/0204847 | A1 | 10/2003 | Ellis et al. |
| 2003/0208756 | A1 | 11/2003 | Macrae et al. |
| 2003/0225777 | A1 * | 12/2003 | Marsh ........................... 707/101 |
| 2004/0010806 | A1 | 1/2004 | Yuen et al. |
| 2004/0045025 | A1 | 3/2004 | Ward et al. |
| 2004/0107437 | A1 | 6/2004 | Reichardt et al. |
| 2004/0168189 | A1 | 8/2004 | Reynolds et al. |
| 2004/0194138 | A1 | 9/2004 | Boylan et al. |
| 2004/0261098 | A1 | 12/2004 | Macrae et al. |
| 2005/0010949 | A1 | 1/2005 | Ward et al. |
| 2005/0022242 | A1 * | 1/2005 | Rosetti et al. .................... 725/58 |
| 2005/0028201 | A1 | 2/2005 | Klosterman et al. |
| 2005/0125823 | A1 | 6/2005 | McCoy et al. |
| 2005/0149964 | A1 | 7/2005 | Thomas et al. |
| 2005/0155056 | A1 | 7/2005 | Knee et al. |
| 2005/0188402 | A1 * | 8/2005 | de Andrade et al. ............ 725/46 |
| 2005/0216936 | A1 | 9/2005 | Knudson et al. |
| 2005/0251824 | A1 | 11/2005 | Thomas et al. |
| 2006/0156336 | A1 | 7/2006 | Knudson et al. |
| 2006/0212894 | A1 | 9/2006 | Knudson et al. |
| 2006/0277574 | A1 | 12/2006 | Schein et al. |
| 2006/0288366 | A1 | 12/2006 | Boylan et al. |
| 2007/0016926 | A1 | 1/2007 | Ward et al. |
| 2007/0033613 | A1 | 2/2007 | Ward et al. |
| 2007/0107010 | A1 | 5/2007 | Jolna et al. |
| 2010/0094869 | A1 * | 4/2010 | Ebanks ........................... 707/732 |

* cited by examiner

SYSTEMS AND METHODS FOR PRESENTATION OF PREFERRED PROGRAM SELECTIONS

BACKGROUND INFORMATION

Electronic program guides (EPGS) provide information to a television viewer regarding potential programs that are available for selection. The programs are typically delivered using a cable network or direct satellite broadcasting arrangement, or other well known video distribution methods. The purpose of the EPG is to inform the viewer of program options that are available for current or future selection, so as to ensure that the viewer is able to choose the program that they would most likely enjoy viewing.

The development of video delivery technologies offers an ever increasing number of choices to viewers and with this is a dilemma for the viewer. While more choices provide a greater opportunity for the viewer to select a desired program, it becomes more difficult for the viewer to determine what programs are available for viewing. The design of EPGs have attempted to adapt and "learn" what preferences a viewer has.

The prior art systems typically store data pertaining to the viewer's selections in the set-top-box, and analyze past viewing patterns to provide a recommendation in the form of a preferred list. Various algorithms can be defined for doing such, but fundamentally these approaches are based on using 'intrinsic' data derived from the viewer's habits. In such cases, the only extrinsic data received by the set top box is the data describing the program attributes. Typically, other forms of extrinsic data are not used for developing a preferred program list. However, using extrinsic data in conjunction with the intrinsic data can provide a more useful preferred viewing list of recommendations. Therefore, there is a need for systems and methods that develop and present a preferred viewing list of programs to the viewer using extrinsic data taking into account viewer preferences

BRIEF DESCRIPTION OF THE SEVERAL VIEWS OF THE DRAWING(S)

DETAILED DESCRIPTION OF PREFERRED EMBODIMENTS

Figure 1:
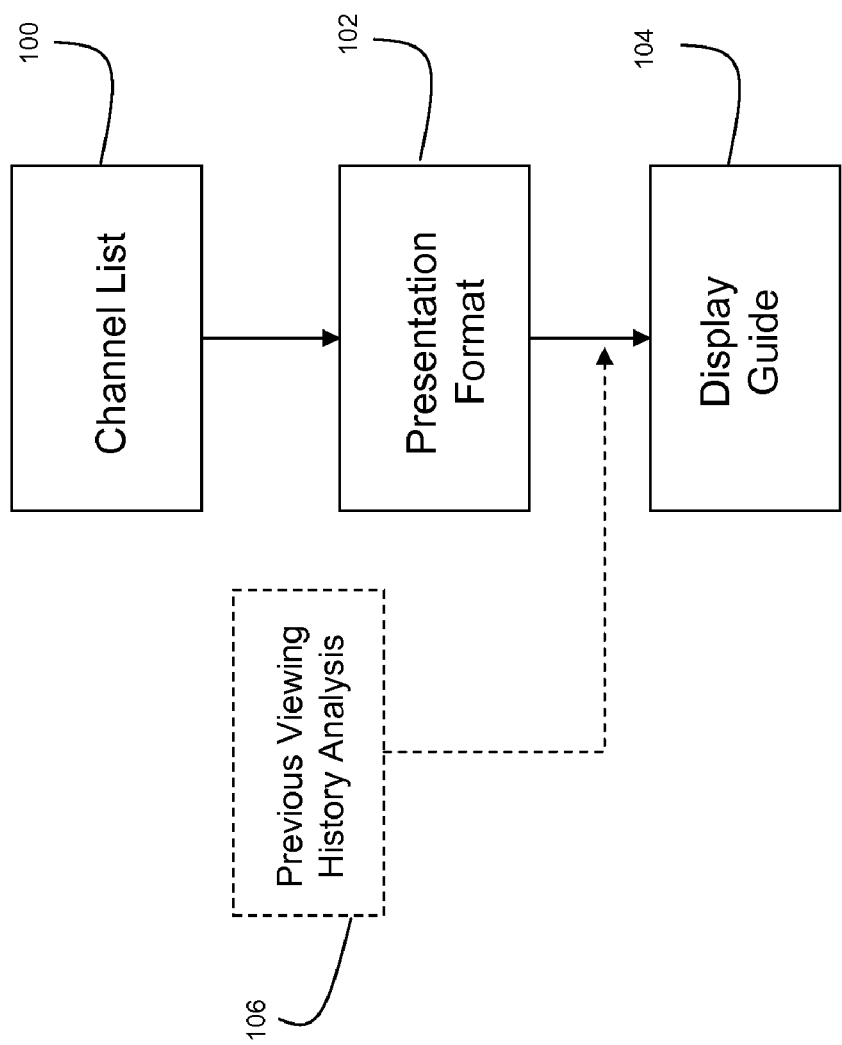
FIG. 1 illustrates one embodiment of a prior art EPG display process.

Various embodiments implemented according to the principles of the present inventions now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions claimed herein will come to mind as the result of the teachings presented in the foregoing descriptions and the associated drawings. Therefore, it is to be understood that the inventions are not to be limited to the specific embodiments disclosed, and that modifications and other embodiments are intended to be included within the scope of the appended claims. Specifically, although the principles of the present invention are embodied in the selection of a video program channel in a digital video system (such provided by a video program provider), the concepts of the present invention can be applied or embodied in the selection of other types of choices or selections, such as musical programs, video games, books, browsing catalog selections on a webpage from a retailer, etc. Although specific terms are employed herein, they are used in a generic and descriptive sense only and not for purposes of limitation.

The development of a preferred viewing list or program guide can be used in several ways by a viewer. The program guide is essentially an ordered list of program titles. As used herein, a program may be any form of a video-based program presented to a viewer, regardless of the type of access network technology being used to deliver the program. Thus, the principles can apply to cable television systems, satellite based systems, local wireless distribution systems, wireless cellular service (including voice and data), etc. Further, the ordered list of items could be musical selections, book titles, video game selections, etc. The principles can apply to a variety of items selected by a user on a periodic basis.

Further, although the preferred embodiments are illustrated in the context of a viewer of an interactive cable television system, it is not so limited to human interaction. The present invention can apply to systems that automatically retrieve, record, or otherwise select a program. For example, digital video recorders (DVR) or the like (which may be deployed internally in a service provider's network) which record programs for future viewing could benefit from the principles of the present invention, effectively acting as a surrogate viewer selecting programs. The present invention can also apply to a system that delivers video using a packet-switched data based access network (e.g., Internet Protocol television or "IPTV") which would naturally support the preferred embodiments described herein. Also, although a "set top box" is referred to herein, any network terminal that can communicate over the access network and supports the facilities described herein may be used to practice the preferred embodiments. For example, a mobile device that supports bidirectional transmissions over a wireless access network could be used to implement the preferred embodiments described herein (or other embodiments of the present invention). These systems may be integrated into the set top box (which is one embodiment of a network terminal), or as separate devices within a service provider's network, as part of a user-owned device, or a third party service provider. Thus, the processing applications for embodying the present invention can be integrated into the set top box, cell phone, or any other type of communication device.

The operation of preferred electronic program guides (EPGs) rely on program data provided along with a program describing certain information about the program (a form of 'meta-data'). This information is processed by software in the set-top-box that extracts the program meta-data and organizes the meta-data into a form that a user can easily interact with. Interacting with the data typically takes on a form of presenting the user with program choices, having the user navigating among the choices and selecting a choice.

A variety of presentation formats are possible, and some include a level of interactivity, allowing two levels of information to be presented (e.g., high level and detailed level). Other embodiments may format meta-data based on time, category, etc. FIG. 1 illustrates one form of the prior art. Typically, processing is performed in the set-top-box, which receives a channel list 100 and examines the meta-data associated with all the program channels. Although the "channel list" or program titles are not necessarily transmitted as a single list, it is logically referred to as such, since the set-top-box comprises a memory for accumulating the data typically in a list structure. Although the set-top-box may receive information about a channel and populate the attributes in the channel list, displaying the channel in the list to the viewer does not always imply that the viewer (e.g., subscriber) is authorized to view the channel. It is often the case that program information is presented for channels that the viewer cannot readily access, as access may require subscription to a premium service or invoking a pay-per-view service. In other contexts, meta-data may be obtained from a third party, such as a rating service (e.g., which rates the programs), a polling service (which determines the relative popularity of the selection), or other source (e.g., a fan club which provides information about an artists latest release). This may utilize a separate application, which can also be provided by a third party, which obtains the meta-data based on various profile information or criteria.

Returning to FIG. 1, the channel list 100 is typically obtained by populating a memory to form the channel list, and a program that defines the presentation format 102 is used to arrange the information is the desired format. At that point, the set-top-box can display the guide information 104 when the appropriate request is made by the viewer for viewing the EPG. In other embodiments, algorithms may be defined analyzing the previous viewing history 106. Such analysis may or may not be present (hence the dotted lines in FIG. 1), and the prior viewing history may redefine the presentation. For example, the system may reorder certain listings, or even interact with the viewer to suggest a program.

The previous viewing history analysis may modify the presentation format, but such systems fundamentally receive a channel list and process the information based on information developed by the device, which in this embodiment is a set-top-box, but could be a PC, DVD player, game console, some other type of network device, etc. For example, viewing history is based on previous viewer interaction with the set-top-box. The set-top-box may retain this information in memory, and process it, but fundamentally no external information has been introduced to the set-top-box for modifying the presentation of the program channels for that viewer. Since the design for such prior art systems were predicated on largely one-way or limited two-way communication networks, such designs were limited to only receiving the channel list, and applying locally determined data for displaying the program guide to the viewer.

The development of interactive television systems (ITS) allows or offers the capability of the set-top-box (STB) to interact separately with a variety of sources. Constraints on processing the channel list in the STB are not limited to data intrinsic to the STB. External data (aside from the program meta-data) can be provided (or obtained) by the STB and used to process channel list information in order to present an EPG of preferred programs or programs predicted to be of interest to the viewer. This provides the viewer with a greater likelihood of quickly identifying a program that will be enjoyed.

Figure 2:
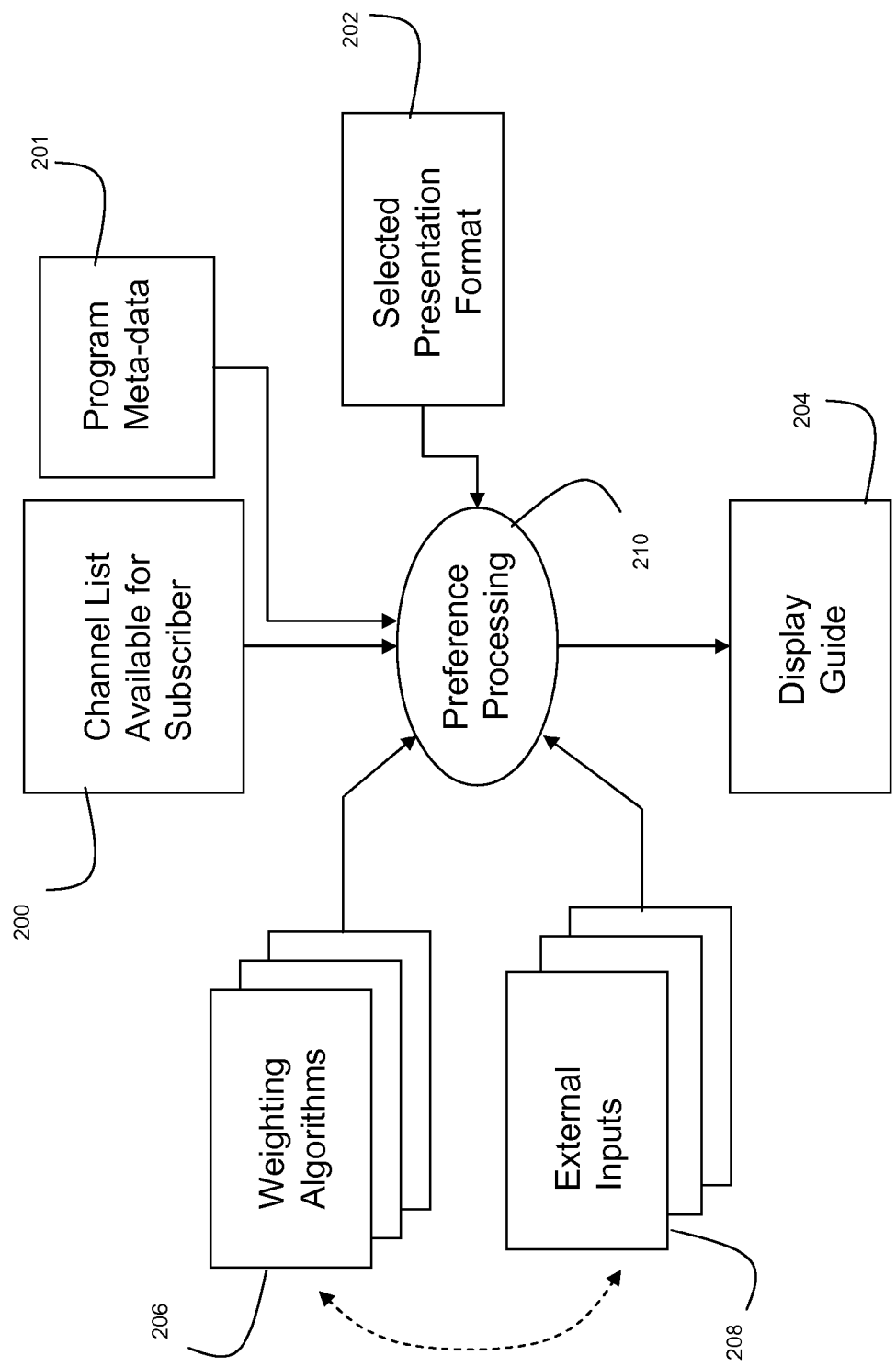
FIG. 2 illustrates one embodiment of preferred list process according to the principles of the present invention.

A high level overview of the processing associated with one embodiment of the present invention is shown in FIG. 2. In FIG. 2, the channel list 200 is still accessible to the set-top-box. As shown in FIG. 2, the channel list may be further limited to those channels that are available for selection by the viewer. Thus, programs requiring a subscription may excluded from presentation. (Other embodiments of the present invention may elect to present all channels, including those not readily available for selection as an enticement for the viewer to subscribe or otherwise pay for the service.) In addition, there is associated meta-data 201 indicating information about a particular program available on that particular channel at a given time. Although this is depicted as being associated with the channel list, the actual meta-data may be obtained, stored, and retrieved separately from the program or channel list. The diagram should not be viewed as requiring any storage format, data hierarchy, or other processing limitation of how the data is addressed, retrieved, or associated with other data.

A variety of presentation formats are possible, and one of a plurality of possible formats 202 can be selected by the user for purposes of formatting the EPG channel. The presentation format may be based in part on the display device (e.g., a high definition television may have a finer resolution, thus allowing more information to be presented). Further, different styles/colors/arrangements of channel presentation formats are possible. In addition, various external inputs 208 are shown. These are provided to the STB (or the STB may proactively query and obtain such data). As will be seen, the format and type of the external inputs may vary and impacts what the viewer may most likely select or enjoy. The inputs are acted upon by various weighting algorithms 206. These algorithms can be downloaded (a.k.a. 'carouseled') to a STB on a periodic basis by the headend, or from a server that can be readily accessed by the STB using IP-based protocols. Typically, each external input has its own weighting algorithm, since the algorithms are typically unique for the particular external input. All these inputs are received and processed 210 so that the STB can produce the display guide 204 for presentation to the viewer.

Typically, the set of the possible selections is based on the channels the user subscribes to, or it may be based on an external third party source which may be a superset of the selections available to the user. For example, the weighting algorithm may act on the set of channels currently available to the user, or may act on the set of channels published by a third party (e.g., a television guide listing).

Figure 3:
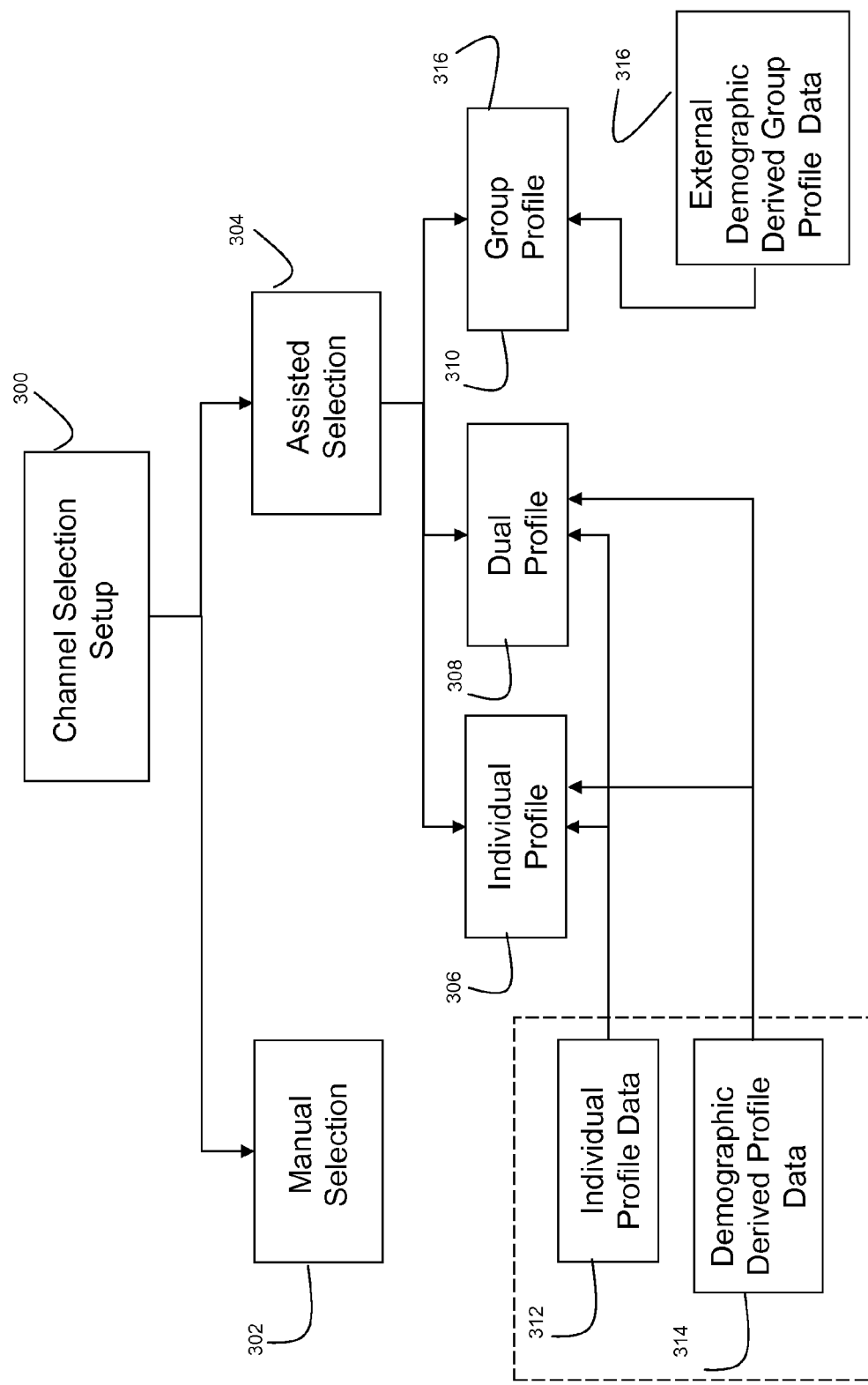
FIG. 3 illustrates one embodiment of various types of external profile data used in developing a preferred viewing list according to the principles of the present invention.

The types of external inputs are varied both in the specifics and in their type. One embodiment of the external inputs used for development of the display guide is shown in a hierarchical relationship in FIG. 3. In FIG. 3, the presentation of the channel selection setup 300 can occur in at least one of two ways. First, a manual selection 302 can occur. In this case, "manual" can be thought of as non-assisted (e.g., in which there is no 'intelligence' used in ordering the channel information) which is one of the prior art approaches. In many embodiments, a non-automated display guide can be selected. This could be a simple list of programs in numerical order, and such a display format maybe preferred in certain cases. In the manual selection, there is no preference made by the system, and hence no external inputs. In one embodiment, the user may opt to view an unassisted program selection guide, which provides a 'straight' list of programs without the application of any logic to order the information for the user.

Focusing on the other branch, the assisted selection 304 process uses various external inputs or data to order the program titles so as to provide value to the viewer. Specifically, the ordering of the program titles is such that more likely to be viewed programs are listed in order. This processing relies on "profiles" which establish certain baselines against which the external data can be compared and weighted. There can be multiple profiles defined, and one or more profiles can be used by a given STB. The first profile is the individual profile 306. This contains certain attributes, preferences, or other data associated with a single, particular viewer. In some instances, there is only a single viewer associated with the STB, so only a single, individual profile is retained by the STB. However, more than one individual profile may exist, allowing the STB to use one of a plurality of individual profiles. If multiple individual profiles exist, either an explicit or implicit associated is made with a viewer. But, once selected, that profile contains the attributes, preferences associated with the single viewer. An explicit association may require an indication from the viewer as to their identity, whereas an implicit association may be based on processing in the STB as to who the individual is.

Another type of profile is a dual profile 308 that reflects a combination of attributes. This profile may be used where a couple interacts with the STB. Using a dual profile may result in a relative balancing of preferred programs when developing the EPG for the viewer. Finally, a group profile 316 may be used. The group profile may be used in lieu of the individual or dual profile. If there is no individual or dual profile established, then a group profile may be used, which is based on demographics similar to that of the viewers. This requires input from the video program (e.g., 'cable') service provider as to some aspect of the group viewer profile operating the STB.

The external data used for each profile is also illustrated in FIG. 3. The individual profile data 312 serves as a source to populate data in the individual profile, which is maintained in the set top box. The external data is not the only source of data, as the individual profile 306 may also contain data derived intrinsically—such as historical viewing histories and patterns. This is derived from the set-top-box itself. Alternatively, or in addition, explicit preferences indicated by the user can be obtained. For example, the contents of the individual profile data 312 may be provided by the individual. For example, assuming that the individual viewer is the subscriber (e.g., the person who established the service and is responsible for payment of the service), the viewer may have provided certain information at the time of service establishment. Such information obviously includes the viewer's name and billing information, but also includes information regarding which channels or packages are subscribed to by the viewer. The viewer may also provide (either at the time of service establishment or via subsequent interaction), information regarding certain aspects of their background. For example, a questionnaire could be provided to the viewer, allowing certain key information to be obtained, including interests, occupation, age, education level, etc. This information can be populated into the individual profile. This information can be updated time-to-time using surveys, third-party information sources, etc.

Similarly, the data regarding an individual can be used to also populate a dual profile 306. A common structure for the dual profile 306 involves two individuals with diverse viewing habits, such as a couple involving a male and female viewer. Although "dual" implies two individuals, this can also generically refer to multiple profiles, and encompass more than two, such as three or four profiles. While the male may enjoy viewing action movies, the female may enjoy viewing romantic movies. In another embodiment, the dual profile may reflect viewing preferences for an adult(s) and a child(ren). The dual profile may also include data regarding viewing histories and derive patterns for updating the dual profile. It is possible that one portion of the dual profile is populated with individual profile data, but the other portion is not, and comprises preference channels based on analysis of viewing patterns. Such may be the case when an individual has created an explicit viewer profile for themselves, but others in the household have not. For example, an adult viewing profile and a viewing profile for a group of children. Further, dual profiles may also reflect different types of selection data. For example, not only would multiple individuals be accommodated for selecting movies, but one individual's profile could pertain to video selections, while another's profile pertains to music selections, while yet another's pertains to video game selections.

The demographic derived profile data 314 may supplement the individual or dual profile data. The demographic derived profile data can be obtained using the individual profile data. For example, a viewer may provide their name upon subscribing to cable service, fiber-optic-based video service, IPTV, mailed DVDs or programs, downloaded content or other content services (which is part of the individual profile data). From this, further information can be readily obtained about that person and stored in the demographic derived profile data 314. For example, a person's name and address can be readily matched against magazine subscriptions to ascertain the persons' interests. A viewer subscribing to various news and commentary magazines may enjoy viewing programs having similar content (news, analysis, and political commentary). Similar, subscription to magazines about science and mechanics would suggest the viewer has an interested in scientific documentaries or engineering oriented programs. Subscription to "how-to" or crafts-based magazines would suggest the viewer would prefer to watch home-improvement or decorating based programs. Thus, extrinsic data can be used to ascertain an interest of the viewer, which can be used to identify program likely to be of interest.

Other external data inputs include ascertaining interests of the individual from their age, spending habits, income level, etc. Demographic-based data can be readily determined from various third-party information providers. The externally derived profile data can be applied to both the individual profile, as well as the dual profile. Affiliations with third party service providers, social organizations, charities, religious organizations, retail buying information, political organizations, etc. can also be used as a source of external data for ascertaining the interests of the individual. As will be discussed, a variety of such extrinsic data can be used to determine program preferences of the viewer.

Finally, externally demographic group profile data 316 can be used. This provides data to the group profile 316. The group profile data is typically based on demographic data derived from similarly situated groups as the viewer. A distinguishing aspect from the individual profile and the group profile is that that the extrinsic data populating the individual profile is based on information known with certainty to be associated with the viewer. For example, the viewer providing their name and/or social security number allows demographic information to be ascertained, where the demographic information is certainly associated with the viewer. In the group profile, likely information about the viewer is used to ascertain demographic information likely to be associated with the viewer. For example, a viewer may opt to withhold providing, or allowing the use of, certain personal data to be shared for purposes of ascertaining an individual profile. Alternatively, only a group profile approach for determining a preferred program list for a viewer may be used. Regardless of the reason, only likely relevant information about the viewer can be used. One approach is to use the zip code of the location of the billing location (e.g., the residence location where the programs are being viewed). Based on this billing area, an income level can be derived, which can be used to select certain externally derived group data. Alternatively, the zip code location may show a strong likelihood of a preference for religious shows of a certain denomination. Alternatively, the zip code may be associated with a "bedroom community" suggesting a preference to family-oriented programs. Thus, an individual profile (or dual profile) may comprise information that is known to be highly relevant to the user's interests, but a group profile may comprise information that is likely to be relevant to the user's interest. For this reason, an individual profile may carry more weight in determining a likely program of interest to a viewer than a group profile. Note, that information from a group profile can augment or supplement information in an individual profile. Alternatively, information from a group profile can be used to provide ideas for test to collect feedback. Further, information from other related view profiles, such as those of other family members, may be used to supplement information on an individual profile.

The external demographic derived group profile data 316 can also be based on collecting and analyzing viewers' viewing patterns. This may be for a certain area (e.g., across the entire cable system or a portion thereof, such as based on a zip code(s)). The collection of viewers' selections (both historical and in real-time), is another form of collecting extrinsic data used to populate the group profile.

The data that is derived or obtained external from the set-top-box, and downloaded to the set-top-box, is known as external or extrinsic data. There is data that may be used in processing known as intrinsic or internal data. The latter is data based on data generated by the set-top-box, itself, such as the viewer's viewing history. This would include a list of the channels or programs viewed, when they were viewed, duration, and possibly (if known), by which member of the household (if more than one). Even information such as "channel surfing" or frequently alternating between certain channels, can yield information on what a viewer's primary and secondary interest is between two simultaneous programs.

Figure 4:
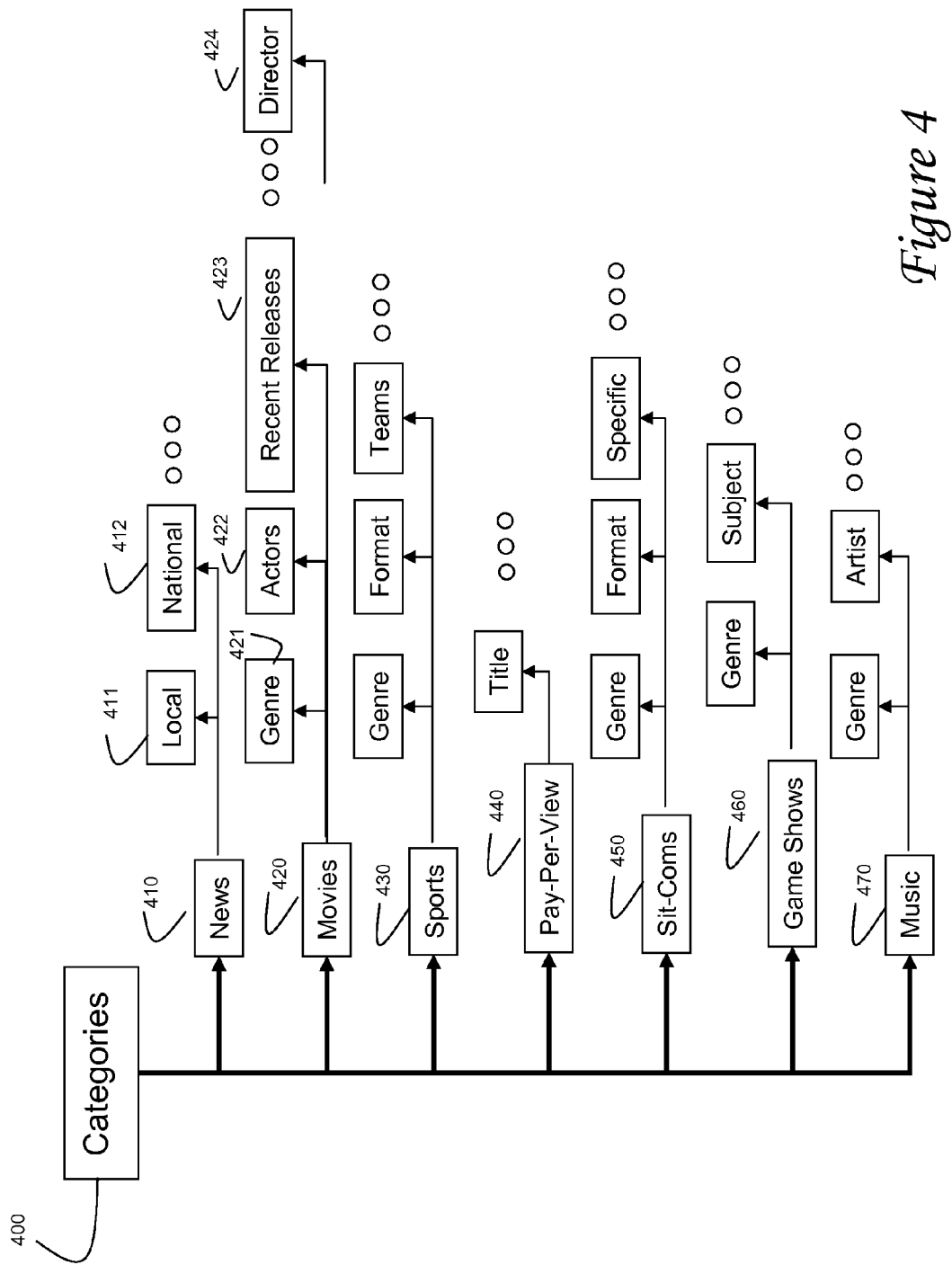
FIG. 4 illustrates one embodiment of various categories and attributes thereof according to the principles of the present invention.

The use of external data, as well as intrinsic data, to develop an effective preferred program choice list for the viewer depends on being able to accurately characterize a program. After all, without being able to classify a program, all programs are indistinguishable from the perspective of being able to classify them. Knowing that a viewer is interested in home improvement is of little value if home improvement programs cannot be identified. Meta-data provided with a program includes an indication as to what category it is associated with and other information that can be used. This can be augmented to provide a finer level of granularity regarding the program type. FIG. 4 illustrates a scheme for providing information (e.g., metadata) regarding various programs.

Although the terms herein refer to processing a "program", the digital content is not what is processed, but rather the respective meta-data. Further, the ordering or ranking of programs is manifested by developing an ordered list of program identifiers, as opposed to the programs' contents. The program identifiers are used to then present the program titles to the viewer.

Turning to FIG. 4, a program is first identified as one from a list of categories 400. The list of categories in FIG. 4 is not intended to be complete, as many other categories can be defined. In FIG. 4, one category is "news" 410. This can be defined to be a news-oriented program, and can be divided into further attributes, such as local 411 or national 412. Additional attributes are not shown, but can also indicate the network originator, anchor person, or format.

Another category is "movies" 420. This would typically have several categories, including genre 421, the main actors 422 in the movie, whether it is a recent release 423, and other attributes, such as name of the director 424. These may be listed in order of relevance in finding a likely preferred program. Other categories shown in FIG. 4 includes sports 430, pay-per-view offerings 440, situational-comedies ('sitcoms') 450, game shows 460, and music 470. The "music" 470 category is not a video program, but reflects potential audio offerings of various types of music programs available on a cable networks well.

In general, the more the categories defined, as well as more attributes for each category, the more accurately the preferred program selection algorithm can recommend or classify programs for the viewer. These categories may include evaluations, reactions or associations that help classification. For example, a fan club or special interest group may provide data on programs, items appearing in programs, or evaluations of programs. The present invention is not limited to using the meta-data provided solely from the program originator, but may be augmented by descriptors defining additional categories that are provided externally.

Figure 5:
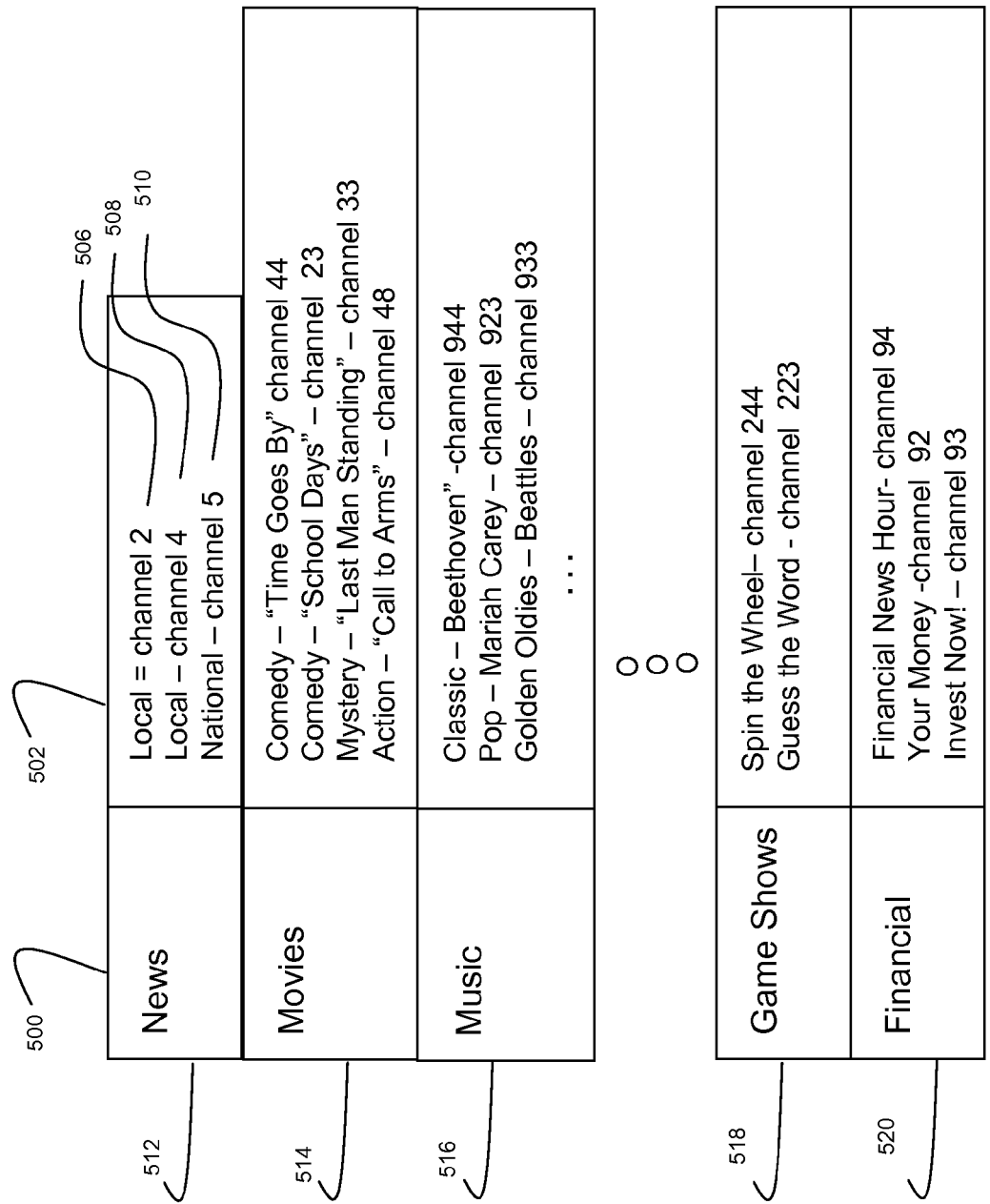
FIG. 5 illustrates one embodiment of a preferred viewing list presentation format according to the principles of the present invention.

Various algorithms can be used to modify the list of available programs into an ordered preferred program listing. FIG. 5 illustrates one embodiment, which is a logical illustration of the ordering. The presentation of the programs is performed by the selected presentation format, which may appear different in different embodiments.

The preferred channel listing can be displayed in a hierarchical arrangement comprising a first column comprising a category 500 and a second column 502 comprising programs in order of likelihood of interest to the viewer. Thus, in FIG. 5, the order of presentation of most likely categories includes news programs 512, movie programs 514, and music programs 516. The last two programs are game shows 518 and financial programs 520. The order of the categories are typically based in part on historical viewing data, the time of day the EPG data is viewed, as well as some external factors, as will be discussed. For example, the list in FIG. 5 may be largely based on the current time—that is, the determination of an ordered list may represent the order for a week-day evening, in which the viewer typically views a news program 512 or a movie 514. The last categories in the list (e.g., games shows 518 and financial-based programs 520) have little likelihood of being selected based on past behavior.

Within each category, various currently available programs (either currently in progress, or about to become available) are presented in an ordered list. For example, in the news 512 category, there are three currently available news programs, which are classified as local 506, 508, or national 510. Further ordering may be based on network originator, using intrinsic or extrinsic information. In the movie category, a ranking could be used for ordering the list (e.g., based on the number of "stars").

The ordering of the programs for FIG. 5 can reflect an ordering using an individual profile—which is fairly stable and reflective of the viewer, although the profile may change over time. In the case of a dual profile, the processing may opt to select the more likely profile based on current time or initial channel selection. Thus, inputs by the viewer regarding selecting a channel, providing explicit viewer identification, or other action may allow the system to adjust and reorder the listing, based on identification of the expected viewer profile that is applicable.

The ordered listing attempts to order all the programs within a category. A threshold level may be defined in which channels can be likely ascertained as being highly likely, or not. Below such threshold, the channels may be ordered using a random order, or ranked in an order wherein the ordering is not particularly reflective of viewer preference. The threshold may be used by the presentation format for purposes of displaying high level information initially comprising programs ranked above the threshold, and displaying detailed information when requested. Other forms of distinction can be used by the presentation format.

Figure 6:
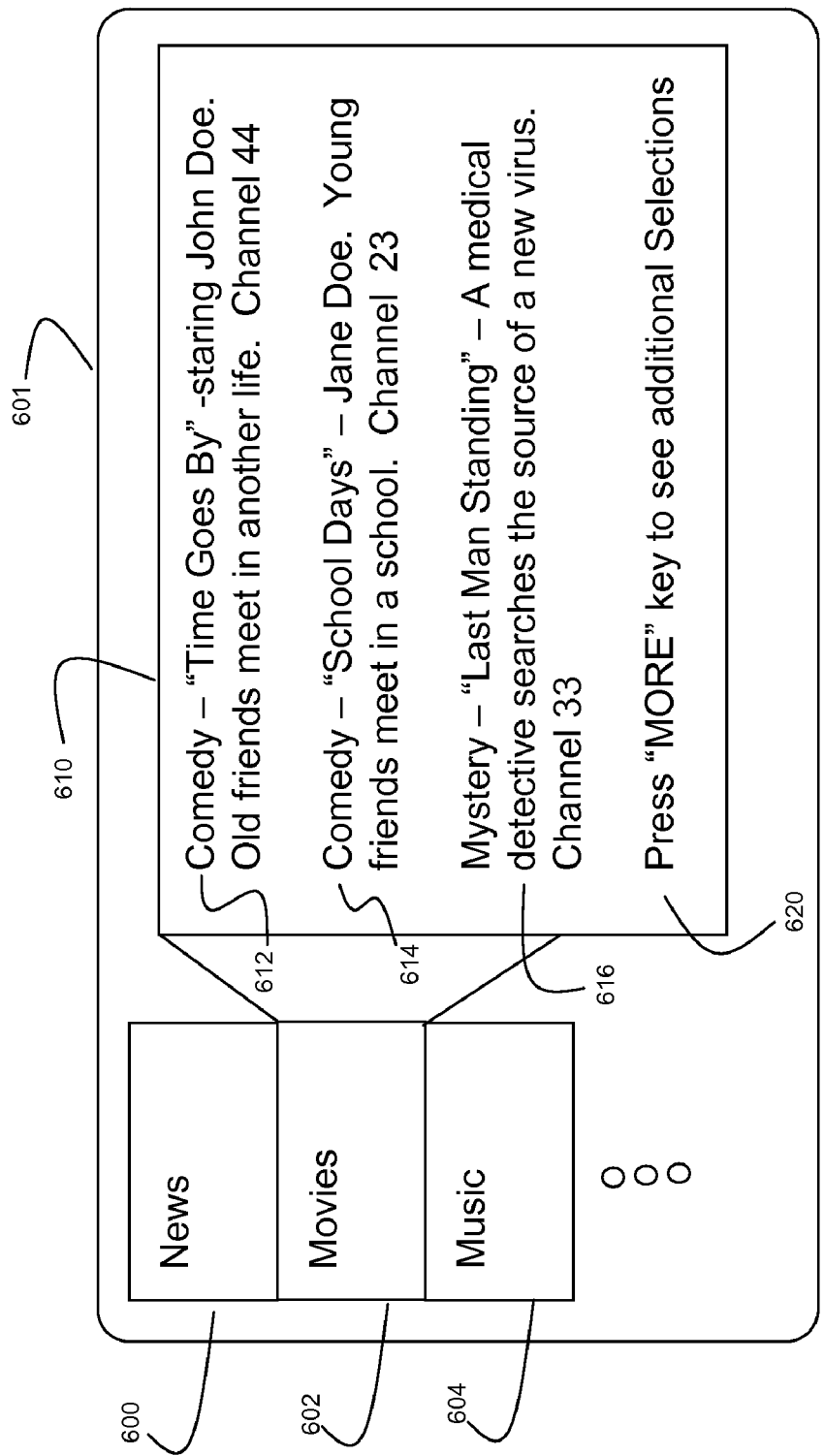
FIG. 6 illustrates another embodiment of a preferred viewing list presentation format according to the principles of the present invention.

This is illustrated in FIG. 6, which shows a presentation format based on the logical listing of FIG. 5. In FIG. 6, a television screen 601 displays a portion of the preferred channel listing. In this embodiment, there are three categories shown: news 600, movies 602 and music 604 based on an algorithm. The viewer has selected to view the movies selections via appropriate interaction with the hand-held remote, so that the movies 602 category is expanded onto the screen using an appropriate window 610 for providing such details. In the movie details window 610, three movies are detailed, in order of preferred likelihood of selection, namely two comedies 612, 614 and a mystery 615. Recall that the movie category in FIG. 5 had four movies ordered, while the presentation format only shows three in FIG. 6. The presentation format may recognize that the size/resolution of the television only effectively supports displaying three movie titles, or may decide that these three titles are the movies for which a likelihood exceeds a threshold level. In any case, mechanisms are defined 620 where the viewer can opt to see the remaining items.

Figure 7:
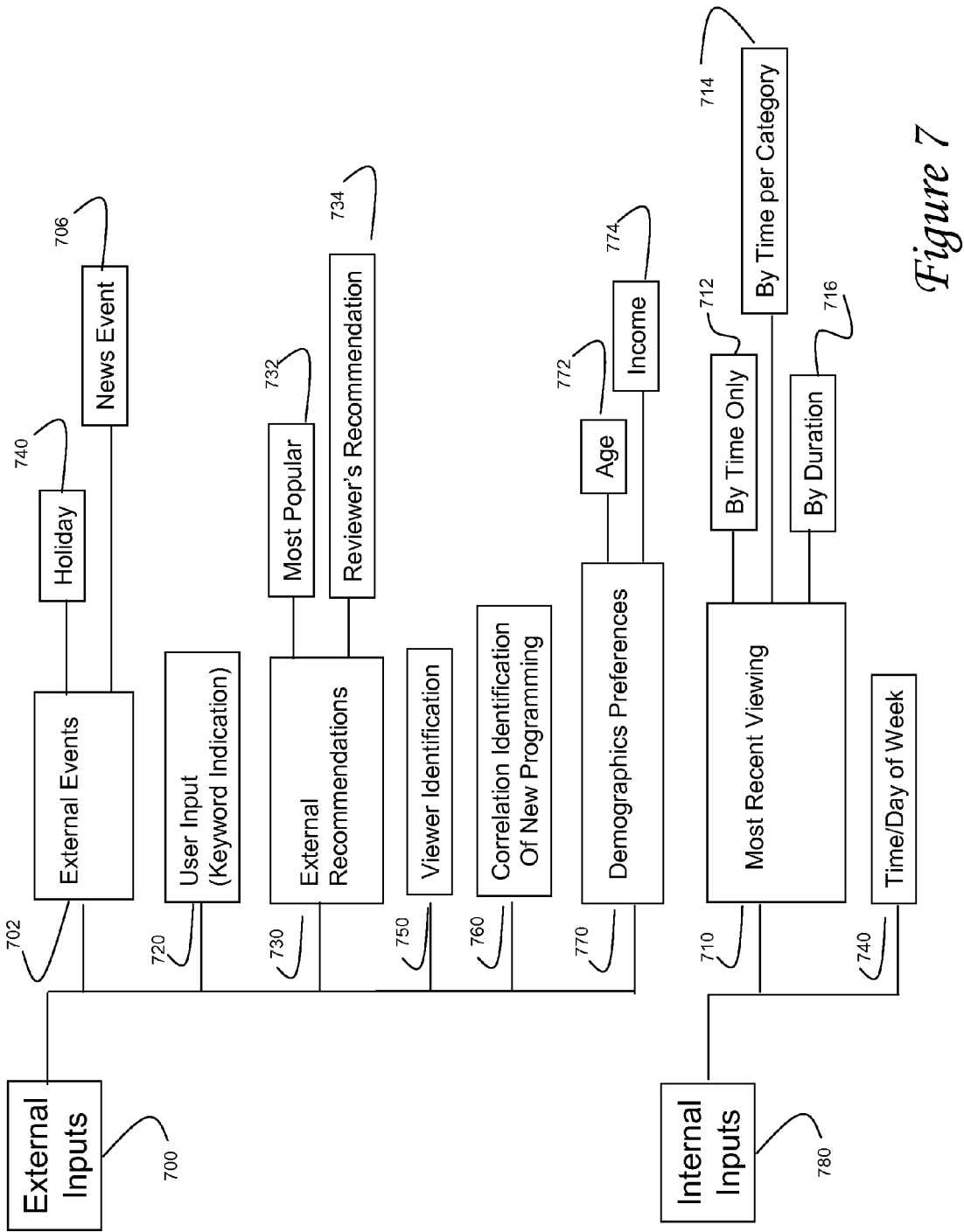
FIG. 7 illustrates some of the types of external inputs and their attributes according to the principles of the present invention.

The inputs which effect the ordering of categories and movies are shown in FIG. 7. FIG. 7 is not intended to be an exhaustive list, but shows the hierarchy of some of the more common external inputs 700 as well as one of the more common internal inputs 760. Each of the inputs is typically weighted, and there is no significant to the ordering of the inputs.

External Events 702 is an external input that reflects recent or timely events. These could range from certain upcoming holidays 740 or news events 706. However, these types of external events are only illustrative, and others including the birthday of the viewer, religious holidays or events, business events, etc. are examples of possible forms of external events. The occurrence of a holiday may be used to impact the ordering of movies, associated with that holiday. Thus, July 4$^{th}$ may cause the preferred programs to be more heavily weighted with a patriotic theme, whereas the approaching of December 25$^{th}$ may cause more heavily weighting Christmas oriented movies. However, if indications in the individual profile indicate that the viewer is of a non-Christian faith, then Christmas-oriented movies may be weighted less. Similarly, occurrence of certain news events, which may garner significant attention, can result in the news categories being more heavily weighted. For example, the occurrence of an earthquake could increase the weighting of documentaries or movies dealing with earthquakes.

Another external input is user input 720. This input is generated by the user using the remote control, and can be invoked by pressing a defined keypad for requesting a certain category. For example, the user may elect to see "movies", and the system would order the listing so that the movie category appears first. In the case of external inputs, these are weighted such that they override some of the other external or internal inputs. Thus, even though a viewer may normally watch news at a certain time during the week, an explicit indication of "movies" would override this.

Another external input is external recommendations 730. External recommendations can be based on various criteria, either solely or in combination. For example, statistics regarding the most popular programs 732 can be collected and/or reported to a server in the cable system, which then communicates them to the STB. Various metrics can be used to measure what is most popular. Another external recommendation includes reviewer's recommendations 734, particularly viewers that are similar situated. Many movie critics review current releases and provide a relative ranking (e.g., four out of five stars) for certain programs, such as movies. These could be used to rank new releases, particularly if the individual profile indicates that such higher ranked movies are viewed often after release. Both schemes may be used in various combinations, depending on the type of program. For example, game shows are unlikely to be critically reviewed and ranked. However, the popularity of such programs, particularly with the demographics of the viewer can be used use to determine a ranking of the program on the EPG. On the other hand, how popular movie is by itself may not convey to the viewer a useful indication, since many viewers may prefer certain types of movies. Thus, a different criteria for one category (e.g., movies) may be used or more heavily weighted than another category (e.g., game shows).

Another external input is user identification 750. This input may inform the STB which user is currently viewing the program. In households with multiple viewers with diverse interests, a viewer may be able to 'log-on' or otherwise indicate who they are prior to receiving the list of preferred programs. This could be accomplished by positioning the cursor over their name, entering a code, or otherwise entering distinguishing information. For example, a PIN or other type of authorization code may be required for viewing of adult movies or for pay-per-view movies. The entry of such a PIN could essentially identify the particular viewer in a multi-viewer household. This may be used to more heavily weight the appropriate pay-per-view category. In single viewer households, a single viewer profile may exist, and such an explicit indication would not be necessary or needed.

Another external category is correlation identification 760. Correlation identification is information attempting to correlate a program with a viewer based on other similar viewers or selections by the viewer. One typical embodiment pertains to movies. A new program, or one that has not yet been viewed by the viewer, may be compared to programs that have been previously selected by the viewer, including those of the same genre, involving the same actors, having the same plot, similar movie reviews, etc. This is predicated on the viewer having selected programs of a certain type likely to select other programs of the similar type.

Finally, the last external input illustrated in FIG. 7 involves demographics preferences 770. These are typically based on age of the viewer 772, income 774, or other factors, such as location. It is possible to ascertain various attributes associated with a viewer without knowing viewer-specific attributes.

FIG. 7 illustrates two internal inputs. These are internal since the STB typically retains or obtains this information, and does not require external transfer of information to know these values. Again, not all such internal inputs affecting program preferences are shown, but two common ones are shown in FIG. 7. First, a history of viewing habits, or recent viewing data 710 can be retained by the STB. This typically analyzes not only what was viewed, but by time 712—that is when certain programs are viewed. This can also be analyzed based on each category 714. For example, local news may be typically viewed before national news, so that at a given time, the local news channels have a high likelihood of selection. Similarly, the recent viewing data may also note viewing habits by duration. Thus, a program viewed for a short time (e.g., 5 minutes) before another is viewed (for a longer time), can be used to ascertain a preference or lack thereof, for certain programs. Further, recent viewing of certain categories (e.g., a movie) can be used to place that movie on a lower list, should the program be repeated in the near future. Thus, if a pay-per-movie is available for several consecutive days, once it is viewed, it may be ranked at a lower level to that viewer for prospective pay-per-view programs. (This is predicated on the assumption that the viewer does not wish to watch the same movie repeated soon after initially seeing it. If past viewing habits indicates a likelihood of repeat movie watching, the same movie may be ranked higher than it would be otherwise.)

Finally, the time of day and the day of week may be used to identify the most likely to be selected category, or program within a category. This may reflect that people have certain viewing habits, such as viewing news or weather-related programs in the morning in order to ascertain the days' travel conditions, watching movies on a Friday evening, etc. The time/day of week can be used to identify viewing habits or patterns associated with a particular profile.

Figure 8:
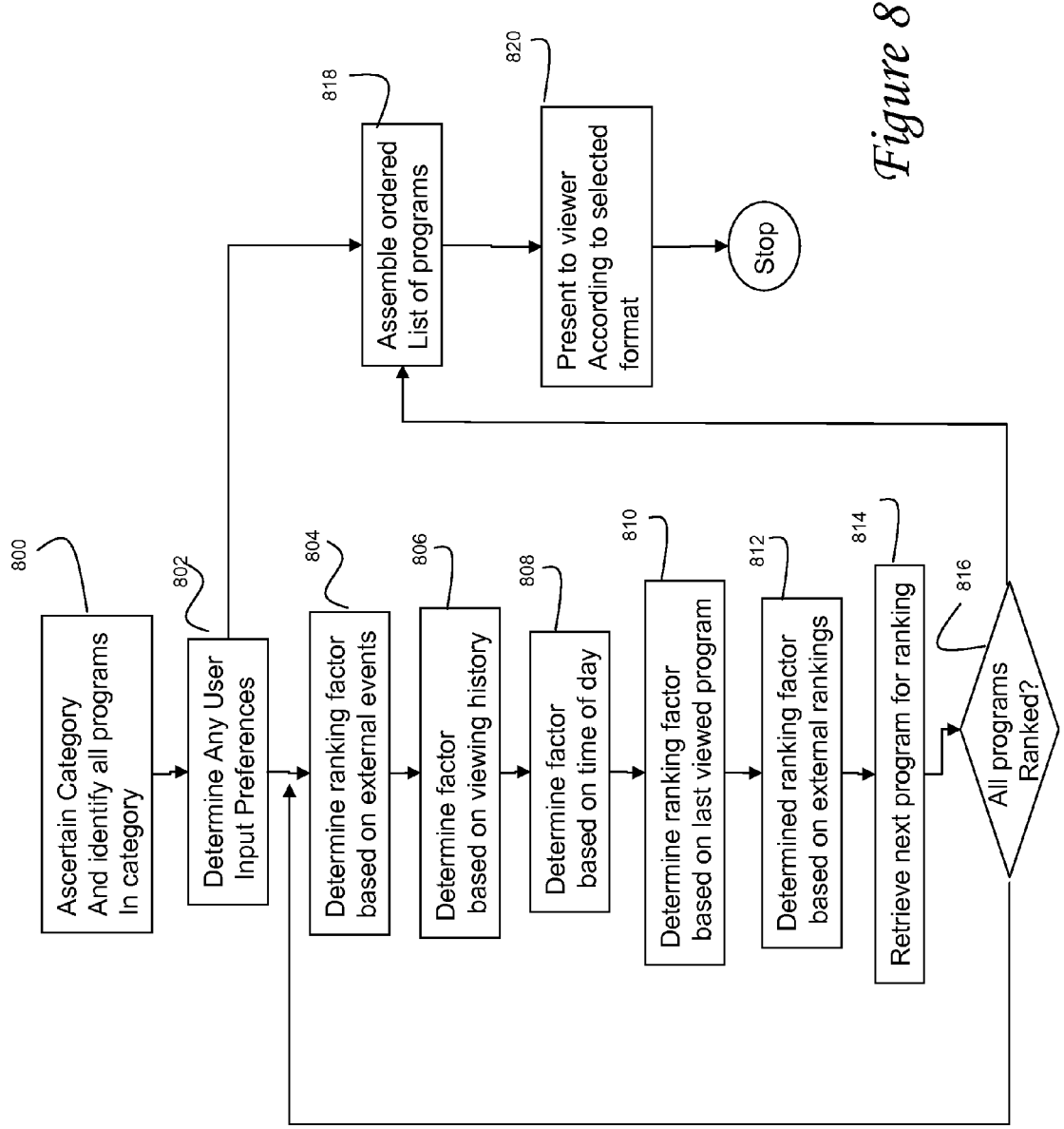
FIG. 8 illustrates one embodiment of processing for programs for developing a preferred viewing list according to the principles of the present invention.

The process for considering the impact of the external and internal factors is illustrated in FIG. 8. In general, the process of ranking a program is based on the summing a series of weighted factors to produce a total score, which is then compared with other scores to produce an ordered list. The process begins at step 800 when a particular category is identified. It is presumed that the list of categories has been already ordered using a similar process as that defined below. All the programs associated with a particular category are ranked, so that at this point, all programs share a common category classification. The next step is step 802 ascertains whether the user has provided any input preferences—e.g., they wish only to see comedies in the movie category. If so, the subset of programs in that category is assembled in step 818 and presented to the viewer at step 820. Explicit input by a user essentially overrides a determination of preferences by the algorithm.

Steps 804 through 812 consider each of the various factors, including the external events at step 804, the viewing history 806, the current time/day of week 808, the most recently viewed program 810, and external rankings 812. The list of factors considered at this point is not exhaustive, and illustrates some of the factors that may be considered. The weighting of external factors may be performed in various orders. Further, additional weighting factors can be added over time. In many cases, a weight of zero will be allocated, indicating that the factor is not relevant. For example, the absence of any particularly noteworthy events or holidays may essentially eliminate consideration of a holiday as an external event in step 804 as a factor. In other instances, it may significantly increase the score of a program.

This process is replicated at step 814 for each of the programs in the category. Once completed in step 816, the programs are scored and can be ordered at step 818, and presented at step 820. The presentation of the ranking may be based on a threshold, so that only the top three scores are presented, with an indication that more exist. Alternatively, the presentation process may display as many as can be fit on the screen. The process can be configurable by the viewer, and stored in the individual profile.

The process of FIG. 8 is predicated on analyzing programs of a certain time window—e.g., those currently available or soon to be available. The process can be expanded to allow the user (or an application program) to select a longer future time window—e.g., the following week. In addition, an automated process can perform this (e.g., at the beginning of the week) and allow the user to simply view a "best picks" for the coming week. The viewer may opt to have that the set-top-box automatically record such movies. Thus, the viewer could be presented with the best picks for current viewing, or for the coming week. In the latter case, the viewer could have the top picks automatically recorded, so that when the viewer is presented with the currently available best picks, they are also presented with previously recorded best picks. In short, the best picks comprises the top scorers in a category that have been recorded and hence available for viewing, presently available for viewing (or shortly available), and those available for viewing in the near future or at a later date.

The presentation/processing of these three classes of programs within a category may depend on the category itself. For example, consider the "news" category. The nature of this information is somewhat ephemeral, and it value may diminish greater after a day or two. Although a program may consistently be at the top of the category for present viewing, it may not be selected by the DVR for automatic recording. Similarly, sports programs may be identified for current or future reviewing (as well as automatic recording), but typically, storing such programs is short lived. For example, once a basketball game has been played and the viewer knows via other sources the outcome of the game (e.g., as reported on the next day's news), there may be little likelihood that the viewer will desire to see the game.

Figure 9:
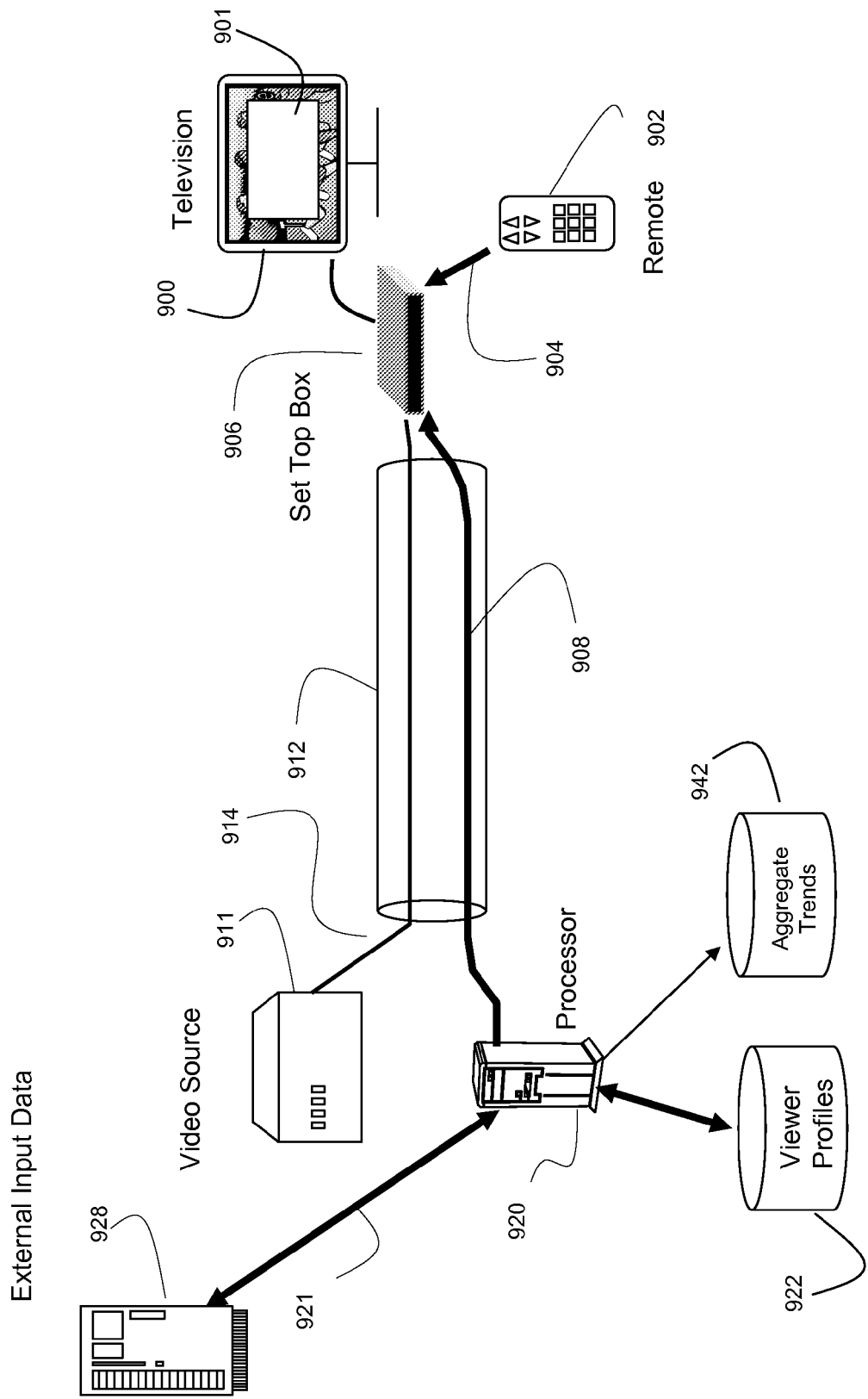
FIG. 9 represents one embodiment of a system for developing a preferred viewing list according to the principles of the present invention.

One embodiment of the architecture for the above system is shown in FIG. 9. In FIG. 9, a television 900 is the display device for displaying information to the viewer. In addition to displaying the video image, the television may display a window 901 containing preferred program selections comprising text and associated channels (not shown). The television 900 receives the signals from a set-top-box 906, which, in turn, receives signals from a cable system provider. The STB 906 interacts with the viewer (not shown) via a remote controller 902 that the viewer operates.

The STB 906 receives signals over a physical medium of an access network 912, which typically is coaxial cable, although optical fiber, copper (electrical) lines and combinations thereof can be used. Other distribution technologies, including wireless are also possible. Multiple connections are available via access network 912. A first connection 914 provides a unidirectional downstream (i.e. towards the STB) information flow (which may be broadcast in nature), for example, a traditional cable television broadcast access network. A second connection 908 provides a bidirectional information flow. This second connection 908 may be implemented as a TCP-IP connection, although other data communication protocols can be used.

Multiple logical information flows are provided to the STB over one or more of the connections. A first logical flow may provide video signals from a video source 911, which comprise the video signals of one or more programs. This logical flow may be transmitted over the first connection 914 or second connection 908 (or a combination thereof). A second logical flow may provide the program metadata. The program metadata may be provided along with the programs, or may be provided as part of a separate distribution (e.g., from a separate source). This information is copied by the STB and populated into a memory. A third logical flow may provide external data to be processed by the STB. In the preferred embodiment, this logical flow is transmitted over the second connection 908.

The external data typically originates from a processor 920 that may receive information from several sources. For sake of simplicity, external data is provided from a system 928 that collects external data of relevance and provides it to the processor, which may store and organize the data in a viewer profile 922. For example, the service provider may collect information about a particular viewer from its own databases or authorized third party databases, such as magazine subscriptions. The service provider may collect that and provide to the processor 920 information that the subscriber is interested in travel, which is stored in the viewer profile database 922. In alternative embodiments, the viewer profile may be stored in the STB.

Finally, an aggregate trends database 942 may collect samples or other data pertaining to viewer's selections. The STB 906 may report to the processor 920 (or the STB can be queried by the processor for a periodic download) on a periodic basis a listing of which programs were viewed by the viewer. The aggregate trends database stores such data for a variety of viewers and can provide data in real-time to the processor 920 regarding which programs are the most popular among viewers, or the most popular for certain demographics groups. The collection data for the trend database may be based on the category of the program.

In one embodiment, the remote control offers a function key(s) for the viewer to indicate their satisfaction with the program. This is way for the system to collect viewer feedback. The function key may simply indicate to the STB that the viewer enjoyed the program, or may invoke an application that interacts with the viewer to rate the program. Once the data is obtained, the STB can transmit the data to the processor which aggregates the data in the aggregate trends database. The processor may also store a copy in the viewer profile, so that further analysis of the feedback can be used to update the preferences of the viewer.

Figure 10:
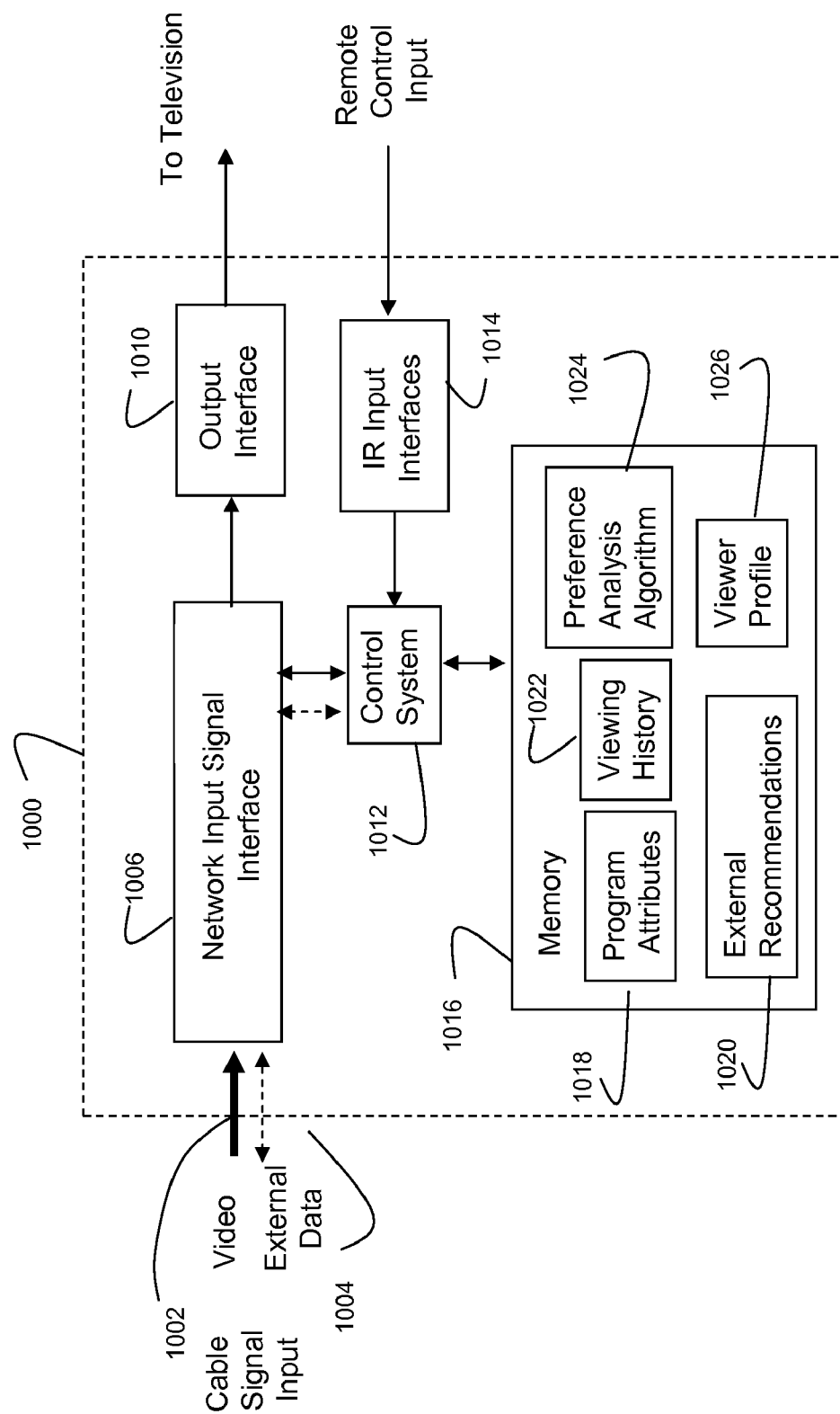
FIG. 10 represents one embodiment of a set-top-box according to the principles of the present invention.

One embodiment of the STB architecture to process the information is shown in FIG. 10. In FIG. 10, the STB 1000 receives multiple signals from the service provider—a video signal 1002 which also includes program meta-data, and external data 1004. The signals may be transmitted over a combination of the first downstream-only connection and the second bidirectional connection. This same bidirectional connection can be used by the STB to send viewing data to the processor. The same information can be passed between the various entities using an IP based network, such as found in an IPTV network.

The signals are received by the network signal interface 1006 which may perform various processing on the incoming signals. For example, the network signal interface 1006 may identify, decode and provide video signals to the output interface 1010, and identify the program metadata and external data and provide this data to the control system 1012. The control system 1012 (which may include a processor) may also control a program selection system (e.g., a tuner in RF-based video systems) according to the functions typically performed by a control system in a STB. The control system 1012 also interacts with the infrared (IR) input interface 1014 to receive commands from the remote control input and provide them to the control system. The control system interprets the commands and controls the program selection system, or provides commands to the signaling processor 920 of FIG. 9 to relay information provided by the viewer.

The control system 1012 accesses memory 1016, which contains several logically associated portions. A first section 1018 stores program attributes indicated by the program meta-data. A second portion 1022 stores a list of the viewing history. The viewing history comprises times during which the STB is turned on, and indicates which channel/program was being displayed during what times. Another portion 1024 stores the preference analysis algorithm used by the control system for ordering the list of programs. This portion may also store the EPG user interface facilities and the presentation format that may be selected by the viewer. Another portion 1020 stores external data 1004 received from the signaling processor 920 of FIG. 9. Another portion of the memory 1026 may store the viewer's profile, or portions stored in a network based profile as well as a STB based viewer profile.

The foregoing represents one embodiment of a system that can provide preferred program indications to a viewer. Variations of the disclosed embodiments are possible, and the claims that follow are only intended to be limited as indicated by the language of the claims themselves.

That which is claimed:

1. A method comprising:
    maintaining, by a network terminal, a viewing history associated with a user of the network terminal;
    maintaining, by the network terminal, a viewer profile associated with the user, the viewer profile comprising data received from a source external to the network terminal and representing at least one attribute associated with the user;
    detecting, by the network terminal, an occurrence of an unforeseen external news event not associated with the user;
    determining, by the network terminal, a program score for each of a plurality of video programs accessible via the network terminal by processing metadata associated with each of the video programs with the viewer profile;
    determining, by the network terminal, a first program category list corresponding to a first program category and comprising a first ordered list of a first subset of the video programs, wherein each of the video programs in the first subset of the video programs has a first common attribute defined by the metadata, wherein the first ordered list is determined by the program scores of each of the first subset of the video programs and a weighting factor related to the occurrence of the unforeseen external news event;
    determining, by the network terminal, a second program category list corresponding to a second program category and comprising a second ordered list of a second subset of the video programs, wherein each of the video programs in the second subset of the video programs has a second common attribute defined by the metadata, wherein the second ordered list is determined by the program scores of each of the second subset of the video programs and a weighting factor related to the occurrence of the unforeseen external news event;
    displaying, by the network terminal, the first and second categories in a first column of an electronic program guide in accordance with a presentation order based on the occurrence of the unforeseen external news event, and at least one of the viewing history, a current time, and a current day of week; and displaying, by the network terminal, the first and second program category lists in a second column of the electronic program guide in accordance with a presentation order based on the occurrence of the unforeseen external news event, wherein one or more of the video programs included in the first or second program category lists have been recorded by the network terminal prior to the current time and day of week, one or more of the video programs included in the first or second program category lists are unrecorded by the network terminal and available at the current time and day of week, and one or more of the video programs included in the first or second program category lists are unrecorded by the network terminal and only available after the current time and day of week.

2. The method of claim 1 wherein the viewer profile comprises an individual profile comprising intrinsic viewing data associated with the user, the individual profile further comprising externally derived profile data downloaded from an access network to the network terminal.

3. The method of claim 2 wherein the externally derived profile data comprises keywords processed in conjunction with the metadata associated with each of the video programs.

4. The method of claim 1 wherein the viewer profile comprises a dual profile comprising viewing data associated with a plurality of individuals, the method steps further comprising:

receiving an indication of selected channel from the user; and ascertaining one of the plurality of individuals identified in the dual profile by processing the indication of the selected channel with respect to the dual profile.

5. The method of claim 1 wherein the viewer profile comprises a group profile and the group profile comprises demographic data associated with a zip code that is associated with a location of the user.

6. The method of claim 1 wherein the step of determining a first program category list comprises selecting one or more video programs included in the plurality of video programs that have a respective program score above a threshold value.

7. The method of claim 1 wherein the viewer profile comprises viewing data indicating a rating parameter and the step of determining the program score for a specific video program is ascertained using the rating parameter.

8. The method of claim 1, wherein the presentation order of the first and second categories and of the first and second program category lists is further based on a religious preference of the user as indicated in the viewer profile.

9. A system comprising:

a video distribution facility that provides a plurality of video programs and associated program metadata indicating attributes of the video programs;

a network terminal connected to the video distribution facility, wherein the network terminal:

receives and stores extrinsic data and the program metadata from the video distribution facility, the extrinsic data comprising data representative of an occurrence of an unforeseen external news event not associated with the user;

processes a subset of the program metadata for each of the video programs with respect to the extrinsic data to develop a plurality of ordered lists of program titles associated with the video programs, wherein each ordered list of program titles corresponds to one of a plurality of program categories and is determined based on a respective program score associated with each of the video programs and a weighting factor related to the occurrence of the unforeseen external news event;

displays the program categories in a first column of a program guide; and displays the program category lists in a second column of the program guide, wherein a presentation order of the program categories in the first column is based on an the occurrence of the unforeseen external news event and at least one of a viewing history associated with a user of the program guide, a current time, and a current day of week;

wherein a presentation order of the first and second program category lists is based on the occurrence of the unforeseen external news event;

wherein one or more of the video programs associated with the program titles included in one or more of the ordered lists have been recorded by the network terminal prior to the current time and day of week, one or more of the video programs associated with the program titles included in one or more of the ordered lists are unrecorded by the network terminal and available at the current time and day of week, and one or more of the video programs associated with the program titles included in one or more of the ordered lists are unrecorded by the network terminal and only available after the current time and day of week.

10. The system of claim 9 wherein the network terminal comprises an individual profile storing the extrinsic data, the extrinsic data comprising demographic data associated with the user of the network terminal.

11. The system of claim 10 wherein the demographic data comprises keywords identifying an attribute that is compared with the program metadata for determining the program score associated with each of the video programs.

12. The system of claim 9 wherein the network terminal comprises a dual profile storing the extrinsic data, wherein the network terminal determines a subset of the dual profile based on a channel selection by the user, the network terminal using the subset of the dual profile to determine the program score associated with each of the video programs.

13. The system of claim 9 further comprising:

an aggregate trend database storing program viewing data for a plurality of users and wherein the extrinsic data comprises data downloaded from the aggregate trend database.

14. The system of claim 9 wherein the network terminal further comprises a processor configured to determine the program score for each of the video programs based on a time of day.

15. The system of claim 9 wherein the network terminal determines the program score for each of the plurality of video programs in response to a request by the user for presentation of the program guide.

16. The system of claim 9 wherein the network terminal comprises a memory storing a threshold value that is compared to the each of the program scores associated with each of the video programs.

17. The system of claim 16 wherein only a subset of video programs out of the plurality of video programs with scores either above or below the threshold are presented to the user.

18. The system of claim 9, wherein the presentation order of the first and second categories and of the first and second program category lists is further based on a religious preference of the user as indicated in the viewer profile.

19. A method comprising:

maintaining a viewer profile associated with a viewer;

determining a program score for each of a plurality of video programs based at least in part on the viewer profile associated with the viewer;

determining a plurality of program category lists each corresponding to one of a plurality of program categories and each comprising an ordered list of a subset of the video programs;

detecting an occurrence of an unforeseen external news event not associated with the user;

displaying the program categories in a first column of an electronic program guide; and displaying the program category lists in a second column of the electronic program guide, wherein a presentation order of the program categories in the first column is based on an the occurrence of the unforeseen external news event and at least one of a viewing history associated with the viewer, a current time, and a current day of week;

wherein each ordered list of video programs is determined based on at least one of the program scores and a weighting factor related to the occurrence of the unforeseen external news event and has a presentation order based on the occurrence of the unforeseen external news event;

wherein one or more of the video programs included in the program category lists have been recorded by the network terminal prior to the current time and day of week, one or more of the video programs included in the program category lists are unrecorded by the network terminal and available at the current time and day of week, and one or more of the video programs included in the program category lists are unrecorded by the network terminal and only available after the current time and day of week.

20. The method of claim 19, wherein the presentation order of the first and second categories and of the first and second program category lists is further based on a religious preference of the user as indicated in the viewer profile.

* * * * *